Figure 2:
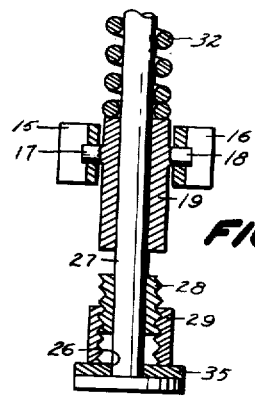

Sept. 14, 1954     R. W. WATERSTREET     2,688,909
HARROW TOOTH MOUNTING
Filed Feb. 27, 1950

INVENTOR.
ROY W. WATERSTREET
BY
Stanley E Zinish
ATTORNEY

Patented Sept. 14, 1954

2,688,909

UNITED STATES PATENT OFFICE 2,688,909

HARROW TOOTH MOUNTING

Roy W. Waterstreet, West Kewaunee, Wis.

Application February 27, 1950, Serial No. 146,573

1 Claim. (Cl. 97—47.83)

This invention relates to farm implements of the spring tooth harrow type, and particularly to a tooth mounting therefor.

An object of my invention is the provision of novel means for mounting harrow teeth whereby they are yieldingly held in their proper operative position and allowed to tilt back should they encounter a stone or other hard substance, and means for returning the teeth to their normal positions after passing the obstruction.

It is another object of my invention to provide novel means for mounting harrow teeth including adjusting means for varying the angle of attack of the point of the tooth relative to the ground.

It is still another object of my invention to provide a harrow tooth mounting of simple and durable construction, highly efficient in practical use and one which may be manufactured at small cost.

Figure 1:
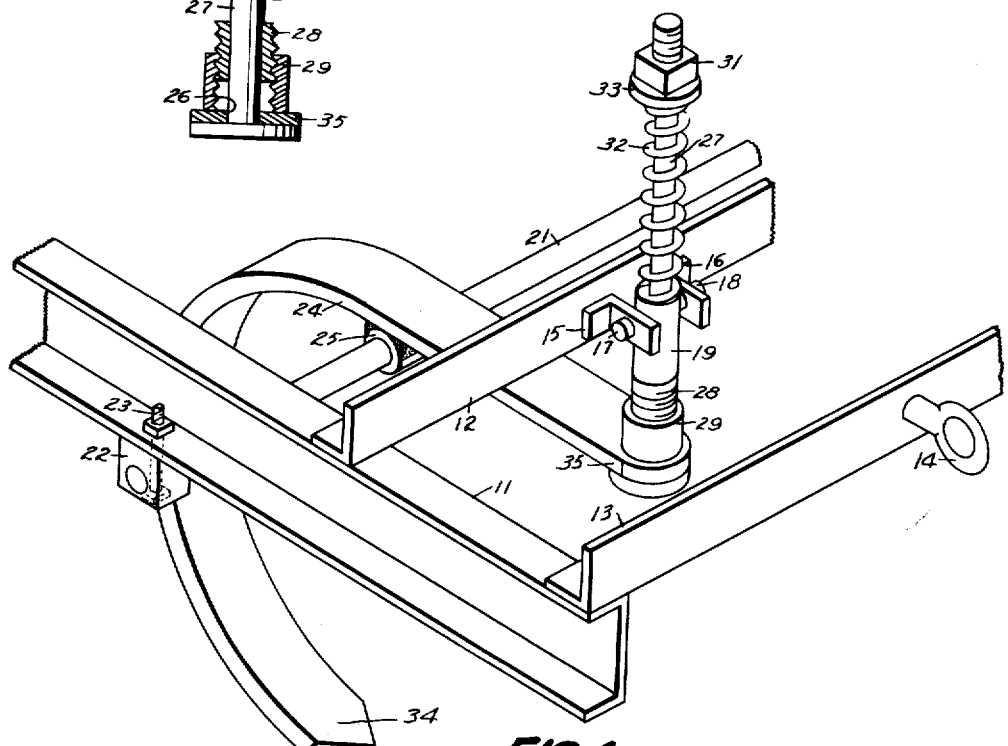

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Fig. 1 shows an isometric fragmentary view of a harrow illustrating my yieldable tooth mounting means; and Fig. 2 is a longitudinal sectional view taken through the yieldable mounting means illustrating the downward displacement of the upper tooth end when the tooth point encounters an obstruction.

Referring now to the drawings wherein like reference characters designate like or corresponding parts throughout the several views, there is shown in Fig. 1 a frame consisting of longitudinal members such as 11, and transverse members such as 12 and 13 secured thereacross as by welding or any other means.

An eye bolt 14 is secured to member 13 for the attachment thereto of any pulling means.

A pair of spaced brackets 15 and 16 are fixed to the front face of member 12, as by welding, and are provided with horizontal axially aligned bores for the pivotal engagement therein of trunnions 17 and 18 integrally formed with tubular guide member 19.

A shaft 21, disposed tranversely across the longitudinal members 11, is fixed rotatively-rigid to said members 11 as by means of blocks 22, and bolts 23 passing through said shaft and said blocks.

A spring tooth 24, having a tubular bearing 25 welded intermediate the ends thereof, is pivotally carried on said shaft 21.

The upper end of said tooth member is provided with an aperture 26 to receive an inverted elongated bolt 27, the body portion of said bolt being slideably engaged in the tubular guide member 19. In operable assembly the end of said tooth bears against the head of said inverted bolt.

Around said bolt, and interposed between the bottom of the guide member 19 and the tooth, is disposed an adjustable means comprising a tubular member 28 having male thread engageable with another tubular member 29 having a female thread. It is obvious that as one member is rotated relative to the other the effective height of the assembly is varied, thereby rotatably displacing the tooth about the shaft, resulting in changing the angle of attack of the tooth point relative to the earth.

The upper end of the bolt 27 is threaded to receive a nut 31, and between this nut and the top of the guide member 19 an initially compressed spring 32 is disposed. Said spring is seated upon said guide member, and has its upper end bearing against a washer 33 under said nut 31. It is obvious that the tension of the spring 32 can be regulated by screwing the nut 31 on the bolt 27, so as to adapt the tooth to different kinds of soil.

Operation: Under normal conditions, the tooth with its associated frame is dragged along land to be harrow worked, the tooth point penetrably engaging with the earth, and plowing it preparatory to planting. The tension of spring 32 is set to the approved normal working tension, for the particular land to be worked, by means of the nut 31, and under normal operating conditions holds the tooth positioned as shown in Fig. 1.

Should the plow point 34 encounter a fixed obstruction such as a stone, the point 34 will swing back drawing the forward end 35 of the tooth member and the associated bolt 27, downwardly, against the tension of spring 32, until the tooth has passed over the obstruction, then the spring will return the tooth to its normal operating position.

It is to be noted that when the tooth encounters an obstruction, the tooth pivots as a whole about shaft 21, resulting in an arcuate movement of tooth end 35 about the axis of shaft 21 as its center. The tooth end 35 accordingly traces a path downwardly and backwardly. The guide 19 being pivotally mounted by means of trunnions 17—18, provides a pivotal arrangement that follows the tooth, whereby the spring is relieved from all lateral strain. That is the spring will always be normally loaded by the tooth.

For some conditions of earth hardness it may be desirable to increase the angle of attack of the point of the tooth, that is, the angle between the point end of the tooth and the earth. This can be accomplished by extending the effective length of the adjusting means comprising tubular members 28 and 29, as by threadedly withdrawing one relative to the other. To decrease the angle of attack a reverse procedure is followed.

The characteristic features of this invention are a novel mounting means for a harrow tooth embodying a yieldable and pivotal link that follows the tooth through a pivotal motion whereby to relieve the yieldable means from all lateral strain, and the inclusion therein of adjusting means for varying the angle of attack of the tooth relative to the earth to be worked.

It should be understood, of course, that the foregoing disclosure relates to only a preferred embodiment of the invention and that numerous modifications or alterations may be made therein without departing from the spirit and the scope of the invention as set forth in the appended claim.

What is claimed and desired to be protected by Letters Patent of the United States is:

A harrow, comprising: a frame; at least one curved spring tooth, having a lower point end and an upper arm end, pivotally mounted intermediate its ends to said frame; a pair of spaced supporting brackets fixed to said frame; a tubular guide member having lateral trunnions pivotally mounted on said brackets, the axis of said trunnions being disposed parallel to the pivotal axis of said tooth; a reciprocable rodular member slideably engaged in said tubular guide member, and having its lower end connected to the upper arm end of said tooth, and its upper end provided with threads and a nut thereon; a compression spring disposed around said rodular member, seated on said guide and shouldering against said nut; and adjustable spacer means comprising a pair of tubular elements threadedly engaged in male-female relation and disposed around said rodular member between said guide and the upper arm end of said tooth.

References Cited in the file of this patent

UNITED STATES PATENTS

| Number | Name | Date |
|---|---|---|
| 1,805,599 | Roberts | May 19, 1931 |
| 1,835,095 | Schanil | Dec. 8, 1931 |
| 1,941,306 | Hotto | Dec. 26, 1933 |

FOREIGN PATENTS

| Number | Country | Date |
|---|---|---|
| 6,356 | Great Britain | Mar. 21, 1908 |
| 111,910 | Australia | Nov. 18, 1940 |
| 553,929 | France | Feb. 20, 1923 |